US012266243B2

(12) United States Patent
Hoover

(10) Patent No.: US 12,266,243 B2
(45) Date of Patent: *Apr. 1, 2025

(54) SYSTEM AND METHOD FOR PRESENTING A BINGO GAME WITH AN ELEMENT OF CHOICE

(71) Applicant: Video Gaming Technologies, Inc., Franklin, TN (US)

(72) Inventor: Justin Hoover, Franklin, TN (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,727

(22) Filed: Oct. 16, 2023

(65) Prior Publication Data

US 2024/0046762 A1 Feb. 8, 2024

Related U.S. Application Data

(63) Continuation of application No. 17/327,233, filed on May 21, 2021, now Pat. No. 11,823,535, which is a continuation of application No. 16/578,730, filed on Sep. 23, 2019, now Pat. No. 11,030,857, which is a continuation of application No. 14/921,534, filed on Oct. 23, 2015, now Pat. No. 10,431,046.

(51) Int. Cl.
*G07F 17/32* (2006.01)

(52) U.S. Cl.
CPC ...... *G07F 17/3276* (2013.01); *G07F 17/3246* (2013.01); *G07F 17/3272* (2013.01); *G07F 17/3293* (2013.01)

(58) Field of Classification Search
CPC ............. G07F 17/3244; G07F 17/3293; G07F 17/3276; G07F 17/3246; G07F 17/3272
See application file for complete search history.

(56) References Cited

U.S. PATENT DOCUMENTS 3,534,963 A 10/1970 Weimer
5,320,351 A * 6/1994 Suzuki .................... A63F 9/143 463/6

(Continued)

OTHER PUBLICATIONS

Office Action dated Oct. 13, 2020 for U.S. Appl. No. 16/578,730 (pp. 1-14).

(Continued)

*Primary Examiner* — Malina D. Blaise
(74) *Attorney, Agent, or Firm* — Armstrong Teasdale LLP

(57) ABSTRACT

A gaming system is provided. The gaming system includes a plurality of game machines and a game server. The game server is programmed to associate each bingo card of a plurality of bingo cards to a game presentation object. The game server is also programmed to transmit, to at least two of a plurality of game machines, the game presentation objects. The game server is programmed to receive, from each of the at least two game machines, a selection of a game presentation object. The game server is programmed to evaluate each bingo card associated with a selected game presentation object against a ball call to determine at least one bingo card having a winning pattern. The game server is programmed to determine results for a competitive wagering game, and transmit the results to each of the at least two game machines.

20 Claims, 6 Drawing Sheets

(56) References Cited

U.S. PATENT DOCUMENTS 5,664,998 A * 9/1997 Seelig .................. G07F 17/3211 463/6
5,938,200 A * 8/1999 Markowicz .......... G07F 17/3223 463/16
6,033,307 A 3/2000 Vancura
6,309,307 B1 * 10/2001 Krause ...................... A63F 1/00 463/16
6,311,976 B1 11/2001 Yoseloff
6,461,241 B1 * 10/2002 Webb ...................... G07F 17/32 463/19
6,755,738 B2 6/2004 Glasson
6,802,776 B2 10/2004 Lind
7,393,280 B2 * 7/2008 Cannon ................... G07F 17/32 463/19
7,666,084 B2 * 2/2010 Herrmann ............... G07F 17/32 463/19
7,708,633 B2 5/2010 Lind
7,766,741 B2 8/2010 Lind
8,147,314 B2 4/2012 Lind
8,157,637 B2 4/2012 Lind
8,226,463 B2 7/2012 Okuaki
8,241,113 B2 8/2012 Rommerdahl
8,262,452 B2 9/2012 Okuaki
8,419,522 B2 4/2013 Lind
8,500,529 B2 * 8/2013 Amaitis .............. G07F 17/3288 463/6
8,500,538 B2 * 8/2013 Warner ................. G07F 17/329 463/19
8,523,653 B2 9/2013 Lind
8,579,695 B1 * 11/2013 Torres ................. G07F 17/3267 463/19
8,777,718 B2 * 7/2014 Smith ................. G07F 17/3211 463/19
9,454,877 B2 * 9/2016 Lamendola ......... G07F 17/3267
9,728,046 B2 * 8/2017 Forman ............... G07F 17/3241
2002/0198042 A1 * 12/2002 Webb .................. G07F 17/3244 463/20
2003/0087683 A1 * 5/2003 Gatto ..................... G06Q 50/34 463/6
2004/0110553 A1 * 6/2004 Dayan ................. G07F 17/3288 463/16
2004/0210507 A1 * 10/2004 Asher ................. G07F 17/3288 705/37
2005/0070353 A1 * 3/2005 Webb ...................... G07F 17/34 463/16
2005/0119042 A1 6/2005 Chamberlain
2006/0028705 A1 2/2006 Ling
2006/0131804 A1 * 6/2006 Morin ................... A63F 3/0665 273/269
2006/0287058 A1 * 12/2006 Resnick .............. G07F 17/3211 463/19
2007/0015547 A1 1/2007 Grier
2007/0155472 A1 * 7/2007 Gail ........................ G07F 17/32 463/19
2007/0178953 A1 * 8/2007 Torkington ............. G07F 17/32 463/6
2009/0111560 A1 * 4/2009 Davis ...................... G07F 17/32 463/20
2010/0230896 A1 9/2010 Ward
2010/0248818 A1 9/2010 Aoki
2011/0117996 A1 * 5/2011 Rommerdahl ...... G07F 17/3267 463/20
2011/0291358 A1 * 12/2011 Havenick ................ A63F 3/062 273/269
2012/0270635 A1 * 10/2012 Colceri ................. G07F 17/326 463/22
2013/0053127 A1 2/2013 Young
2013/0316796 A1 * 11/2013 Arnone ................... A63F 13/00 463/25
2014/0025640 A1 1/2014 Prahlad
2014/0235318 A1 * 8/2014 De Viveiros Ortiz ....................... G07F 17/3267 463/19
2014/0256409 A1 * 9/2014 Wood .................... G07F 17/326 463/25
2014/0357338 A1 12/2014 Pockaj
2015/0072766 A1 3/2015 Hughes
2016/0232738 A1 * 8/2016 Daly ..................... G07F 17/326

OTHER PUBLICATIONS

Notice of Allowance dated Feb. 10, 2021 for U.S. Appl. No. 16/578,730 (pp. 1-9).
Office Action (Non-Final Rejection) dated Oct. 19, 2022 for U.S. Appl. No. 17/327,233 (pp. 1-12).
Office Action (Final Rejection) dated Feb. 14, 2023 for U.S. Appl. No. 17/327,233 (pp. 1-13).
Office Action (Notice of Allowance and Fees Due (PTOL-85)) dated Jul. 20, 2023 for U.S. Appl. No. 17/327,233 (pp. 1-7).

* cited by examiner

SYSTEM AND METHOD FOR PRESENTING A BINGO GAME WITH AN ELEMENT OF CHOICE

CROSS-REFERENCE TO RELATED APPLICATIONS

This application is a continuation of and claims priority to U.S. patent application Ser. No. 17/327,233, filed May 21, 2021, which is a continuation of U.S. patent application Ser. No. 16/578,730, now U.S. Pat. No. 11,030,857, filed Sep. 23, 2019, which is a continuation of U.S. patent application Ser. No. 14/921,534, now U.S. Pat. No. 10,431,046, filed Oct. 23, 2015, the entire contents and disclosures of which are hereby incorporated by reference in their entireties.

BACKGROUND

The embodiments described herein relate generally to gaming systems and methods that present bingo games and, more particularly, to systems and methods for presenting a bingo game with an element of choice.

Conventionally, many Class II game systems conduct a wagering game based on a bingo game. In such a wagering game, a game system provides a bingo card to a player in exchange for a wager. The bingo card is typically generated at random and is evaluated against a randomly-drawn ball call. The evaluation determines whether the player wins and, if so, determines a payout.

In certain game systems, although a bingo game is the basis for the wagering game, the presentation of the wagering game to the player varies greatly with respect to a traditional bingo game. For example, certain game systems present the wagering game and results as a reel-based slot machine, where winning patterns on a given bingo card are presented as winning patterns on the reels of the slot machine. Such a presentation leverages the appeal of slot machines to players, while remaining in a Class II gaming environment.

BRIEF DESCRIPTION

In one aspect, a gaming machine is provided. The gaming machine includes a display, a user interface, and a processor. The display is configured to present a player with a choice among at least first and second game presentation objects for a bingo game. A selection of the first game presentation object is made by the player through the user interface. The processor is coupled to the user interface and the display. The processor is configured to respectively associate the first and second game presentation objects to first and second bingo cards. The processor is further configured to receive the selection and admit the first bingo card to the bingo game according to the association between the first game presentation object and the first bingo card.

In another aspect, a method of presenting a bingo game. The method includes displaying a game presentation for the bingo game. The game presentation includes first and second game presentation objects. The method further includes respectively associating the first and second game presentation objects to first and second bingo cards. The method further includes presenting a player a choice among at least the first and second game presentation objects. The method further includes receiving a selection by the player of the first game presentation object. The method further includes admitting the first bingo card to the bingo game according to the association between the first game presentation object and the first bingo card.

In yet another aspect, a gaming server is provided. The gaming server includes a non-transitory memory, a network interface, and a processor. The non-transitory memory is configured to store computer executable instructions for conducting a bingo game. The network interface is couplable to a network to which a game machine is communicably coupled. The processor is coupled to the non-transitory memory and the network interface. The processor is configured to execute the computer executable instructions to randomly generate first and second bingo cards. The processor is further configured to execute the computer executable instructions to respectively associate the first and second bingo cards to first and second game presentation objects. The processor is further configured to execute the computer executable instructions to receive a selection of the first game presentation object from the game machine through the network interface. The selection is made among at least the first and second game presentation objects. The processor is further configured to execute the computer executable instructions to admit the first bingo card to the bingo game according to the association between the first game presentation object and the first bingo card.

BRIEF DESCRIPTION OF THE DRAWINGS

The embodiments described herein may be better understood by referring to the following description in conjunction with the accompanying drawings.

DETAILED DESCRIPTION

Figure 1:
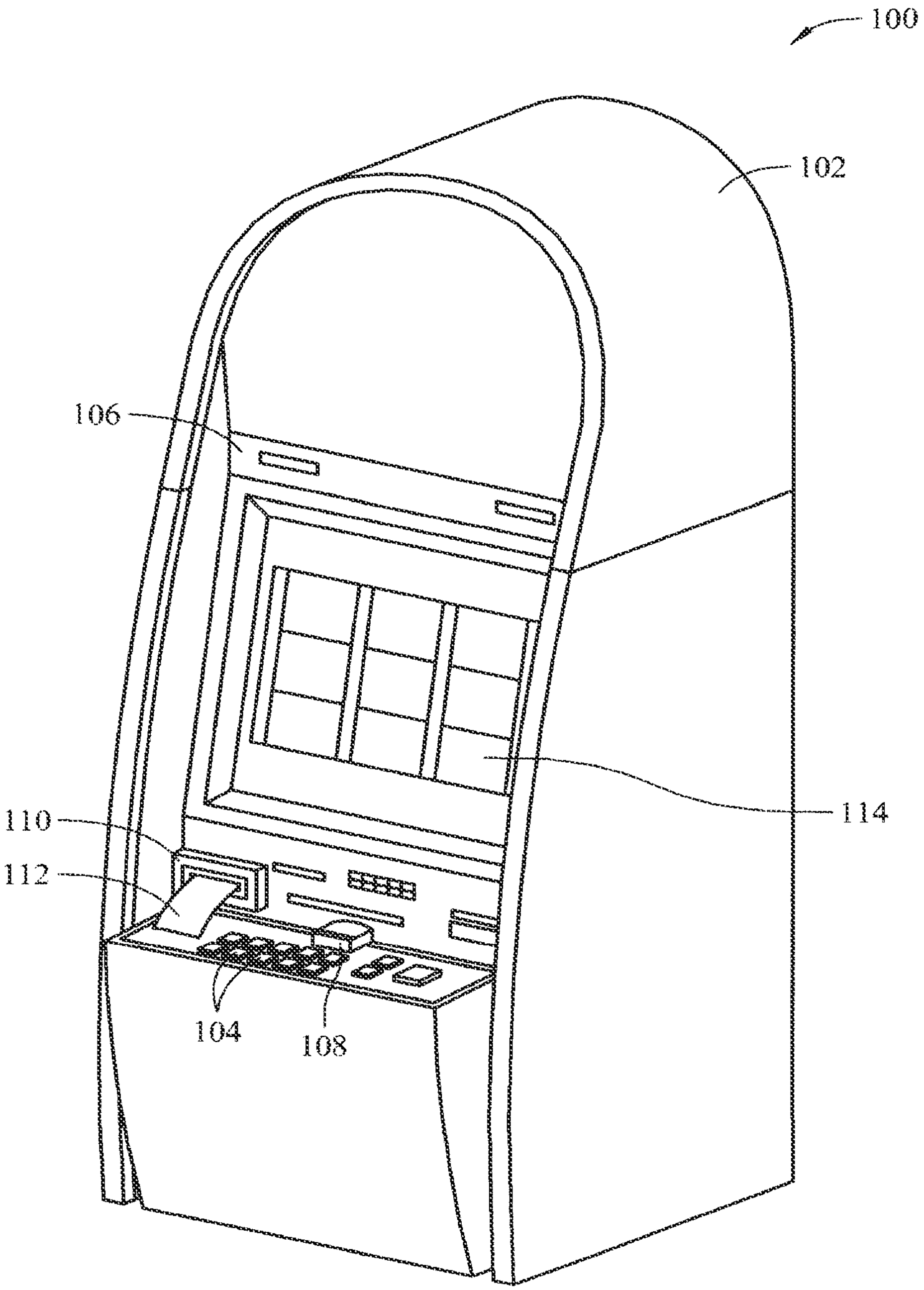
FIG. 1 is a schematic diagram of one embodiment of a gaming machine.

Class II gaming systems are often limited in the variety of game presentations that may be employed in presenting a bingo or bingo-based game on a game machine. The lack of variety presents challenges with respect to player appeal, player engagement, and player retention. Potential players seek gaming systems that offer new experiences. Current players often decide whether to continue playing based on their level of engagement and overall experience with the gaming system.

The limitations on game presentation variety arise with the gaming system's tie to bingo games; because the game outcome is determined by an evaluation of a bingo card against a randomly-drawn ball call. Generally, the level of player engagement amounts to making a wager in exchange for a bingo card and, perhaps, daubing the bingo card and claiming a prize. Reel-based or slot-style game presentations provide an additional visual appeal to a player, as well as visual engagement. Many players seek nothing more than a slot machine experience, even though the reel-based game is a mere abstraction of the underlying bingo game and the outcome is determined based on a randomly-drawn ball call. Other players desire more engagement. Such engagement may be found in game presentations involving other wagering games often found in casinos, including poker, blackjack, roulette, and craps, among others. In a video poker game presentation, where a video poker game is an abstraction of an underlying bingo game, a winning poker hand represents a winning pattern on the bingo card on which the player wagers. The game outcome is determined based on an evaluation of the bingo card against a randomly-drawn ball call, and is presented to the player as a poker hand that manifests that game outcome.

It is realized herein that an element of choice can be incorporated into certain game presentations for bingo and bingo-based gaming systems. A player may be presented two or more bingo cards that can be admitted to a forthcoming bingo game. The player selects a bingo card and the gaming system admits that bingo card to the bingo game, where it is evaluated against a randomly-drawn ball call. The game presentation presents the player the choice, not as a choice between bingo cards, but as a choice between two or more game presentation objects. The game presentation objections are abstractions of the bingo cards and represent the bingo cards in that particular game presentation. A selection of one game presentation object among several, amounts to a selection of one bingo card among several. The bingo cards are generated as they would in any other game presentation, such as, for example, in a reel-based game presentation.

Game presentation objects are pieces of the game presentation. For example, in certain embodiments the game presentation is a contest between two or more contestants. The contestants are game presentation objects. A selection of a contestant constitutes a selection of a bingo card to be admitted to an underlying bingo game. Such a game presentation pits the contestants against one another in a simulated contest. The outcome of the simulated contest is determined based on a randomly-drawn ball call and an evaluation of whichever bingo cards are admitted to the bingo game. For a particular player, the selected contestant represents a selected bingo card. The outcome of the bingo game is determined by an evaluation of the selected bingo card against the randomly-drawn ball call. The game presentation presents the simulated contest to the player according to the outcome determined by the evaluation. For example, if the evaluation finds a winning pattern on the selected bingo card, the simulated contest manifests that winning pattern as a win for the selected contestant.

In certain embodiments, the game presentation includes a simulated race among two or more contestants. Such a race may, for example, be between two or more horses, between two or more dogs, between two or more cars, between two or more watercraft, or between two or more people. The contestants are game presentation objects in the game presentation of the simulated race. The contestants represent different bingo cards a player may select.

In certain embodiments, for example, the game presentation is a role playing game. The role playing game proceeds along a storyline. As the storyline progresses, decision points arise for the player. Based on the choices of the player, the role playing game may proceed down two or more divergent paths within the storyline. In such embodiments, the various paths within the role playing game are the game presentation objects. When the player makes a decision within the role playing game and selects a path, the selected path represents a bingo card that is admitted to the underlying bingo game. The outcome of the bingo game is determined by an evaluation of the bingo card against a randomly-drawn ball call. The outcome manifests in the game presentation as a successfully carried out activity in that role playing game.

In certain embodiments, the game presentation includes a shooter-style role playing game. As a player proceeds along a storyline for the shooter-style role playing game, the player is presented a choice among two or more types of projectiles or ammunition, which are game presentation objects representing different bingo cards. Selection of a type of projectile or ammunition causes the shooter-style role playing game to proceed down a particular path of the storyline. For example, a selection of a first type of projectile or ammunition may result in a certain level of damage and accuracy exacted on a target, while selection of a second type of projectile or ammunition may result in another level of damage and accuracy exacted on a target. Such selections also represent selection of one bingo card over another, and therefore affect the outcome of the underlying bingo game. The outcome of the bingo game for the selected bingo card manifests in the game presentation as some level of success in shooting a target. The player perceives an impact of her selection on the results of the shooter-style role playing game. Although, the selection and results are abstractions of a selected bingo card and an evaluation of the selected bingo card against a randomly-drawn bingo card.

In certain gaming systems, certain winning patterns on a bingo card are rewarded more than others. Various levels of winnings in an underlying bingo game are represented in a game presentation as various levels of wins in the simulated contest. For example, in an embodiment where the game presentation simulates a fight between two or more fighters, a selected fighter may win a single round to reflect a small payout in the bingo game, and the selected fighter may win the entire fight to reflect a large payout in the bingo game. In other embodiments, where the game presentation simulates a race between contestants, various levels of winning in the underlying bingo game are represented by the selected contestant coming in first, second, or third in the simulated race.

Exemplary technical effects of the systems, methods, and apparatus described herein include at least one of: (a) providing players an element of choice in a bingo or bingo-based game; (b) providing greater variety in game presentations for bingo or bingo-based games; (c) improving appeal of bingo and bingo-based games to potential players; and (d) improving engagement and retention of players of bingo and bingo-based games.

FIG. 1 is a schematic diagram of an exemplary gaming machine 100. Gaming machine 100 may be any type of gaming machine, and may include, without limitation, different structures than those shown in FIG. 1, such as, for example, a personal computer, tablet computer, smart phone, personal digital assistant (PDA), cellular phone, and any other web-enabled device. Moreover, gaming machine 100 may employ different methods of operation than those described below.

In the exemplary embodiment, gaming machine 100 includes a cabinet 102 configured to house a plurality of components, such as a gaming machine controller, peripheral devices, displays, and player interaction devices. For example, in an exemplary embodiment, gaming machine 100 includes a plurality of user interfaces, or input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits. User interfaces, in certain embodiments, include one or more touch screens as user interfaces.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more displays 114. Displays 114 are mounted to cabinet 102, and may include a primary display for displaying a primary game and a secondary display for displaying a secondary or bonus game. Displays 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In one embodiment, display 114 displays a game presentation that includes one or more game presentation objects, game images, symbols, or indicia, such as a visual representation or exhibition of movement of an object (e.g., a mechanical, virtual, or video reel), dynamic lighting, video images, and the like. Display 114 may include touch screen capabilities as a user interface to facilitate player interaction with the game presentation.

Figure 2:
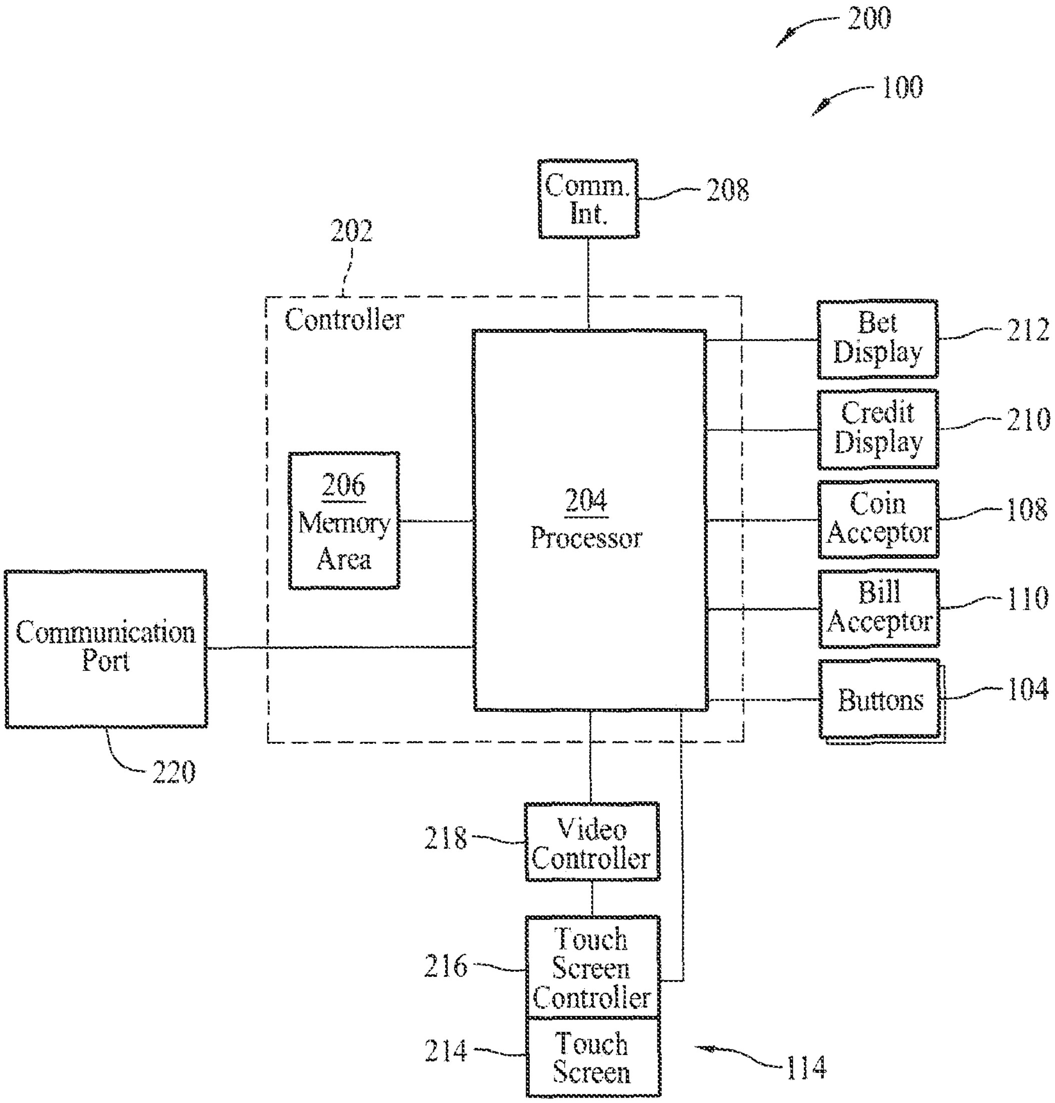
FIG. 2 is a block circuit diagram of one embodiment of an electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled to a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Communication interface 208 may operate as an input device (e.g., by receiving data from another device) and/or as an output device (e.g., by transmitting data to another device). Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 includes non-transitory memory that stores program code and instructions, executable by processor 204, for controlling gaming machine 100. For example, memory area 206 stores data such as image data, event data, player input data, random or pseudo-random number generation software, pay table data, trigger event conditions, game play events, a list of predefined periods of time to execute the game play events, game play outcomes, and/or other information or applicable game rules that relate to game play on gaming machine 100. In certain embodiments, the data and the computer-executable instructions may be stored in a cloud service, a database, or other memory area accessible by gaming machine 100. Such embodiments reduce the computational and storage burden on gaming machine 100. As such, memory area 206 may be a local and/or a remote computer storage media including memory storage devices. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212, which displays a player's amount wagered. Credit display 210 and bet display 212 may be standalone displays independent of display 114, or credit display 210 and bet display 212 may be incorporated into display 114.

Moreover, in an exemplary embodiment, display 114 is controlled by controller 202. In some embodiments, display 114 includes a touch screen 214 and an associated touch screen controller 216. In such embodiments, display 114 may operate as an input device in addition to presenting information. A video controller 218 is communicatively coupled to controller 202 and touch screen controller 216 to enable a player to input game play decisions (e.g., actions on and selections of game presentation objects) into gaming machine 100 via touch screen 214. Furthermore, gaming machine 100 includes one or more communication ports 220 that enable controller 202 to communicate with external peripheral devices (not shown) such as, but not limited to, external video sources, expansion buses, other displays, a SCSI port, or a key pad.

Figure 3:
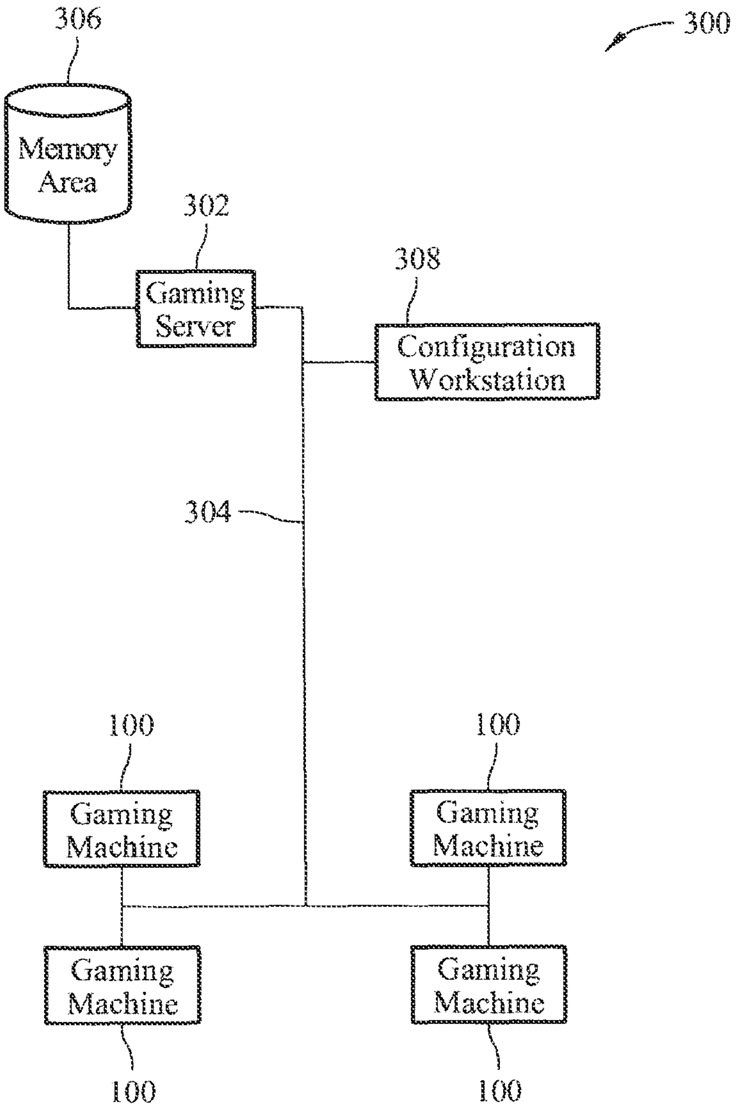
FIG. 3 is a block schematic diagram of one embodiment of a gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 (shown in FIG. 2) to one or more servers, such as a gaming server 302, using a network 304. Gaming server 302 may have an architecture such as electrical architecture 200 (shown in FIG. 2) for gaming machine 100. Gaming server 302 includes a processor (not shown) and a network interface, such as communication port 220 that facilitates data communication between gaming server 302, each gaming machine 100, and other components of gaming system 300. Such data is stored in, for example, a memory area 306, such as a database, that is coupled to gaming server 302.

In one embodiment, one or more gaming machines 100 may be remote gaming machines that access a casino over network 304. As such, a player is able to participate in a game of chance on a remote gaming machine. In this embodiment, it will be understood that a player operating a remote gaming machine has virtual access to any casino coupled to network 304 and associated with gaming server 302. Gaming machines 100 may also be a personal computers coupled to the Internet or to a virtual private network such that a player may participate in a game of chance, remotely. In other embodiments, the player may use a cell phone or other web enabled devices coupled to a communication network to establish a connection with a particular casino. Moreover, gaming machines 100 may be terminal-based machines, wherein the actual games, including random number generation and/or outcome determination, are performed at gaming server 302. In such an embodiment, gaming machines 100 display results of a game via display 114 (shown in FIGS. 1 and 2).

In one embodiment, gaming server 302 performs a plurality of functions including, game outcome generation, player tracking functions, and/or accounting functions, to name a few. For example, gaming server 302 may track data of players using gaming machines 100. For example, gaming server 302 can store physical characteristics of players, such as, but not limited to, a gender of a player and an age of a player. Gaming server 302 can also track and store other data related to the players using player tracking identification, such as a player card. For example, gaming server 302 can store information about a player, such as loyalty points, player address, phone number, and/or any information that may be retrieved and transmitted to gaming machines 100. In some embodiments, gaming server 302 stores and tracks information such as, but not limited to, an average amount of a wager played at gaming machines 100, any funds a player may have in an account, as well as data relating to reportable events. However, in alternative embodiments, gaming system 300 may include a plurality of servers that separately perform these functions and/or any suitable function for use in a network-based gaming system.

For example, gaming server 302 may provide a bingo or bingo-based game to a player operating one of gaming machines 100. That is, server 302 may display a game presentation for the bingo game on display 114. The player initiates the bingo game by inserting an appropriate amount of money or tokens at coin acceptor 108 or bill acceptor 110 and then push a play button (for example, one of player input buttons 104. When the wager is received, server 302 enables the game presentation to proceed in simulating a contest or other game.

In certain embodiments, server 302 enables the game machine to present the player with a choice among two or more game presentation objects respectively associated with two or more bingo cards. The player selects one of the game presentation objects through the game machine, and the selection is received at server 302. Server 302 admits the corresponding bingo card to the bingo game and determines whether the player wins an award and/or additional credits based on an evaluation of the selected bingo card against a randomly-drawn ball call.

Figure 4:
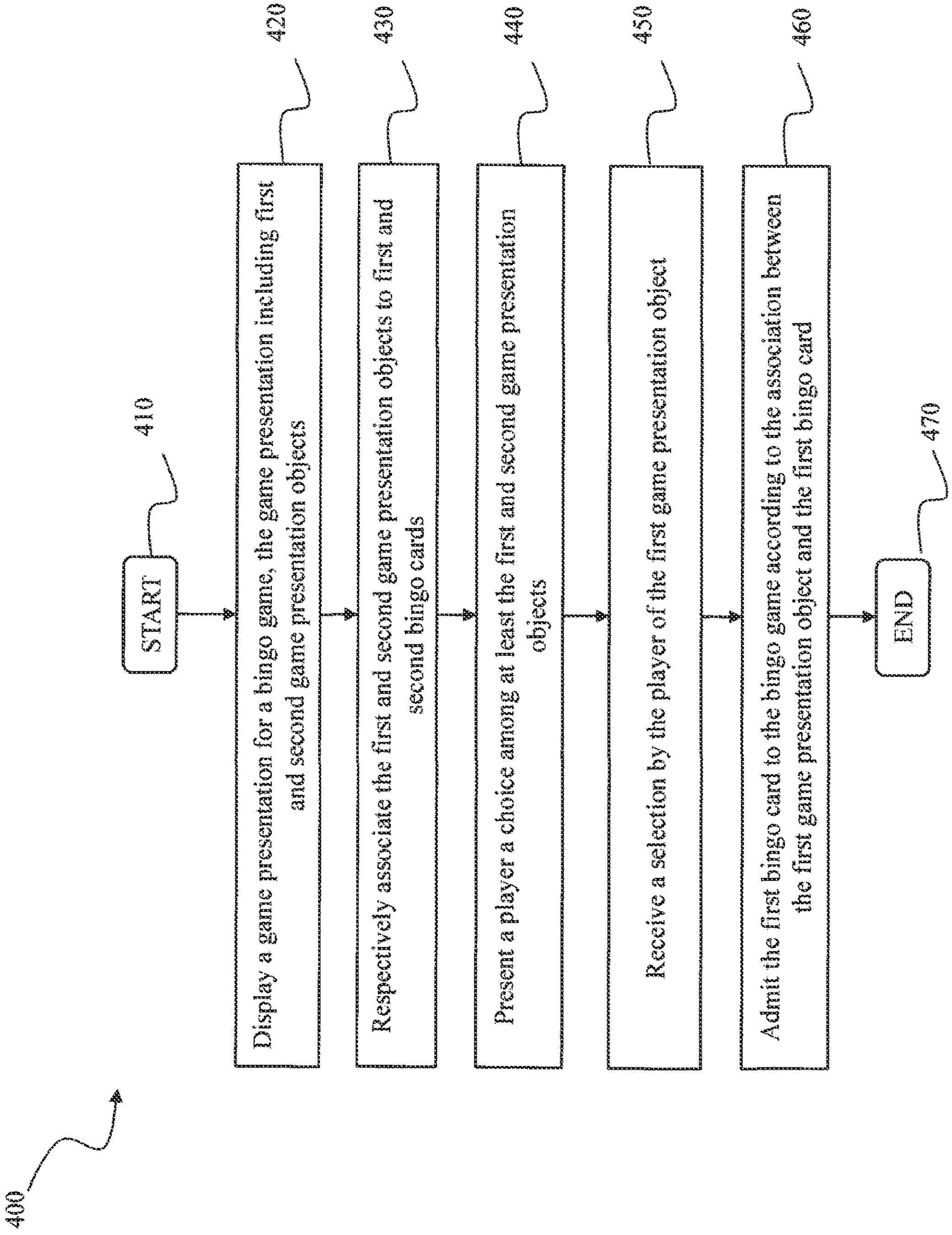
FIG. 4 is a flow diagram of one embodiment of a method of presenting a bingo game.

FIG. 4 is a flow diagram of one embodiment of a method 400 of presenting a bingo game. The method begins at a start step 410. At a game presentation step 420, a game presentation for a bingo game is displayed. The game presentation includes at least first and second game presentation objects. At an association step 430, the first and second game presentation objects are associated with respective first and second bingo cards. The bingo cards may be randomly generated in real time or may be randomly generated in advance of the game presentation.

At a choice presentation step 440, a player is presented a choice among at least the first and second game presentation objects, which represent the first and second bingo cards. The player selects one of the game presentation objects (e.g., the first game presentation object), and that selection is received at a selection receipt step 450. At an admission step 460, the bingo card corresponding to the selected game presentation object (e.g., the first bingo card) is admitted to the bingo game according to the association from association step 430 of the selected game presentation object and the corresponding bingo card (e.g., the association of the first game presentation object and the first bingo card. The method then ends at an end step 470.

Figure 5:
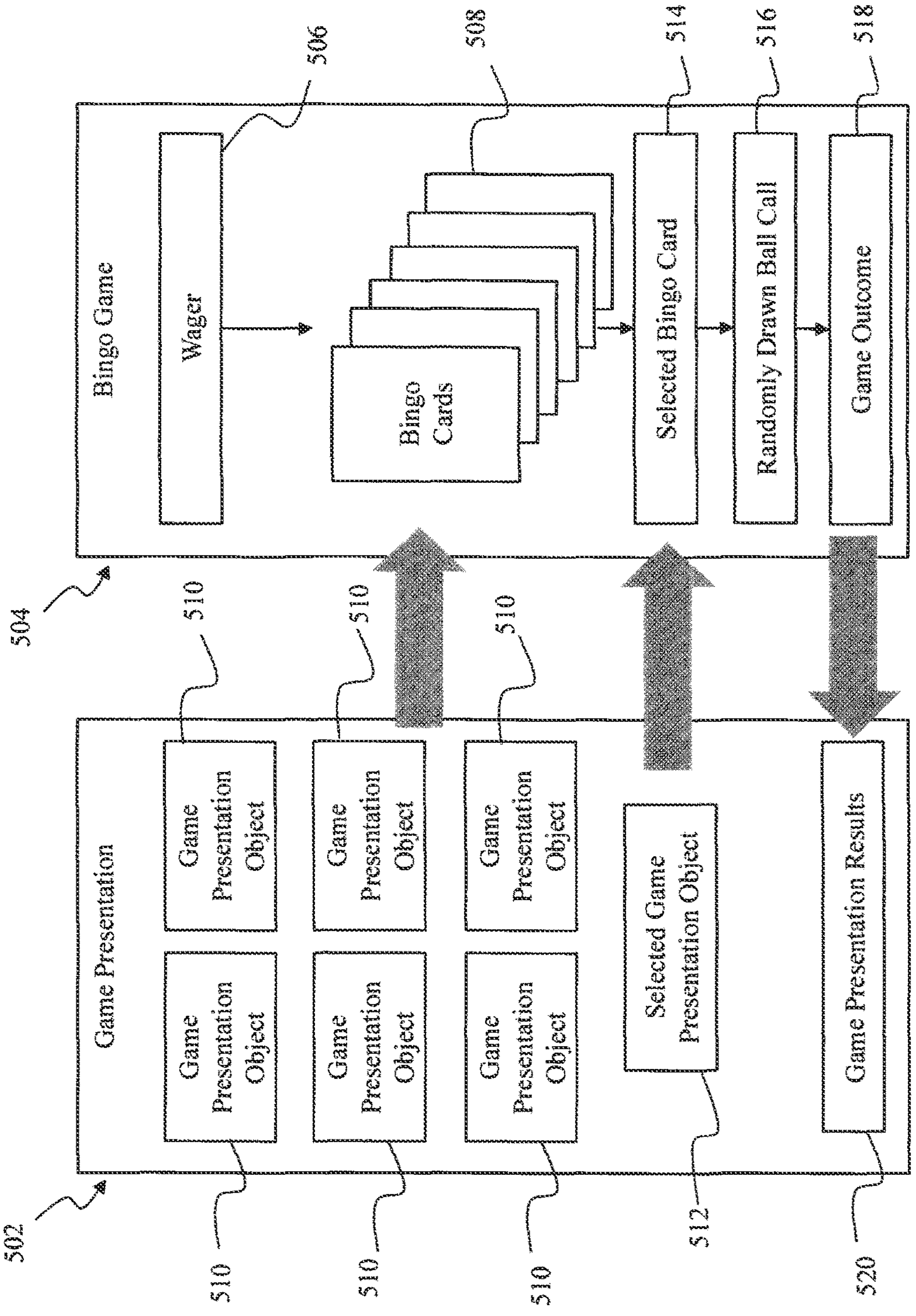
FIG. 5 is a block diagram of one embodiment of a game presentation and a corresponding bingo game.

FIG. 5 is a block diagram of one embodiment of a game presentation 502 and a corresponding bingo game 504. Bingo game 504 is initiated by a wager 506. Generally, in exchange for wager 506, bingo game 504 provides one of multiple bingo cards 508 to the player. Game presentation 502 includes multiple game presentation objects 510 respectively associated with one of bingo cards 508. Game presentation 502 presents the player a choice among game presentation objects 510, effectively allowing the player to select one of bingo cards 508.

The player selects a selected presentation object 512, which corresponds to a selected bingo card 514 for bingo game 504. During the course of bingo game 504, selected bingo card 514 is evaluated against a randomly-drawn ball call 516 to determine a game outcome 518. Game presentation 502 presents game outcome 518 to the player in the form of game presentation results. For example, in one embodiment where game presentation 502 includes a race among several contestants, and a selection of a contestant is a selection of selected game presentation object 512, which corresponds to selected bingo card 514, game outcome 518 is presented to the player as race results for the selected contestant.

Figure 6:
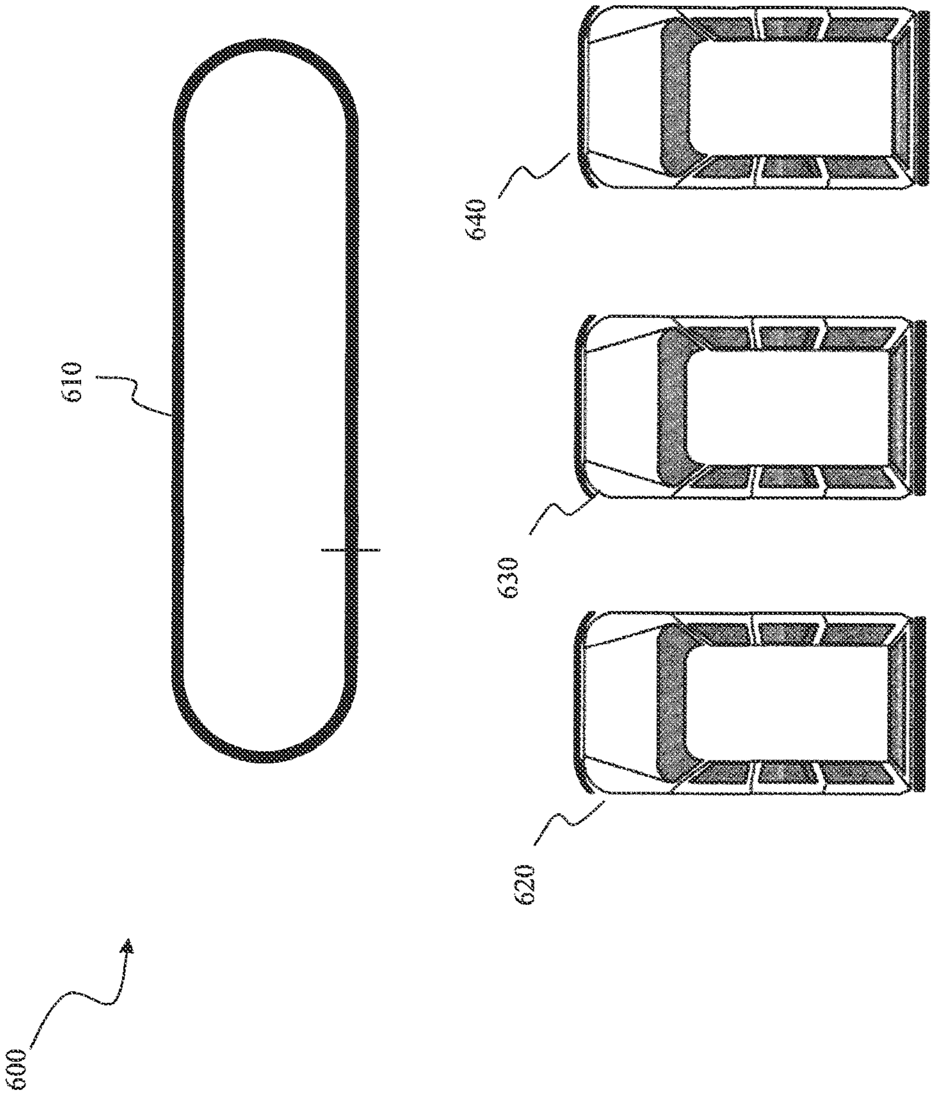
FIG. 6 is an illustration of one embodiment of a game presentation for a corresponding bingo game.

FIG. 6 is an illustration of one embodiment of a game presentation 600 for a corresponding bingo game. Game presentation 600 includes a race around a track 610 among several cars 620, 630, and 640. Each of cars 620, 630, and 640 is associated with a bingo card for the corresponding underlying bingo game. A selected car among cars 620, 630, and 640 represents a selected bingo card, which is evaluated against a randomly-drawn ball call to determine a game outcome for the bingo game. The game outcome is presented as an order-of-finish among cars 620, 630, and 640 in a race around track 610. For example, if car 630 corresponds to a winning bingo card in the bingo game, car 630 will finish the race in a winning position.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable non-transitory media. By way of example and not limitation, computer readable media include computer storage media and communication media. Computer storage media include volatile and nonvolatile, removable and non-removable media implemented in any method or technology for storage of information such as computer readable instructions, data structures, program modules, or other data.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

receive a selection of a selected game presentation object from a plurality of game presentation objects, wherein the plurality of game presentation objects are associated with a plurality of bingo cards, and wherein the selected game presentation object is associated with a bingo card of the plurality of bingo cards;

determine results for an electronic game based at least in part upon an evaluation of a ball call and at least two bingo cards of the plurality of the plurality of bingo cards, wherein the at least two bingo cards include the bingo card and a second bingo card associated with an unselected game presentation object of the plurality of game presentation objects;

determine results for at least two of the plurality of game presentation objects in a simulation based at least in part upon a ranking of outputs associated with the evaluation of the ball call and the at least two bingo cards, wherein the at least two of the plurality of game presentation objects are associated with the at least two bingo cards, and wherein the results in the simulation for a respective game presentation object of the at least two of the plurality of game presentation objects are provided based upon the ranking; and cause display of the results for the electronic game and at least a portion of the simulation, wherein the portion of the simulation includes display of the selected game presentation object and the unselected game presentation object based upon the ranking.

2. The electronic gaming device of claim 1, wherein the instructions further cause the at least one processor to receive at least one message from a server, wherein the at least one message is associated with the results for the electronic game.

3. The electronic gaming device of claim 2, wherein the instructions further cause the at least one processor to determine the results for the electronic game based at least in part upon the at least one message.

4. The electronic gaming device of claim 2, wherein the at least one message includes at least one of the bingo card or the ball call.

5. The electronic gaming device of claim 1, wherein the instructions further cause the at least one processor to cause display of at least the portion of the simulation by causing display of a visual comparison of the at least some of the plurality of game presentation objects, the visual comparison indicating an order-of-finish among the at least some of the plurality of game presentation objects.

6. The electronic gaming device of claim 5, wherein the order-of-finish indicates relative positions of the at least some of the plurality of game presentation objects.

7. The electronic gaming device of claim 1, wherein the plurality of game presentation objects comprise at least one of a plurality of horses, a plurality of dogs, a plurality of cars, a plurality of watercraft, a plurality of people, a plurality of paths, a plurality of fighters, a plurality of projectiles, or a plurality of ammunition types.

8. At least one non-transitory computer-readable storage medium with instructions stored thereon that, in response to execution by at least one processor, cause the at least one processor to:

receive a selection of a selected game presentation object from a plurality of game presentation objects, wherein the plurality of game presentation objects are associated with a plurality of bingo cards, and wherein the selected game presentation object is associated with a bingo card of the plurality of bingo cards;

determine results for an electronic game based at least in part upon an evaluation of a ball call and at least two bingo cards of the plurality of the plurality of bingo cards, wherein the at least two bingo cards include the bingo card and a second bingo card associated with an unselected game presentation object of the plurality of game presentation objects;

determine results for at least two of the plurality of game presentation objects in a simulation based at least in part upon a ranking of outputs associated with the evaluation of the ball call and the at least two bingo cards, wherein the at least two of the plurality of game presentation objects are associated with the at least two bingo cards, and wherein the results in the simulation for a respective game presentation object of the at least two of the plurality of game presentation objects are provided based upon the ranking; and cause display of the results for the electronic game and at least a portion of the simulation, wherein the portion of the simulation includes display of the selected game presentation object and the unselected game presentation object based upon the ranking.

9. The at least one non-transitory computer-readable storage medium of claim 8, wherein the instructions further cause the at least one processor to receive at least one message from a server, wherein the at least one message is associated with the results for the electronic game.

10. The at least one non-transitory computer-readable storage medium of claim 9, wherein the instructions further cause the at least one processor to determine the results for the electronic game based at least in part upon the at least one message.

11. The at least one non-transitory computer-readable storage medium of claim 9, wherein the at least one message includes at least one of the bingo card or the ball call.

12. The at least one non-transitory computer-readable storage medium of claim 8, wherein the instructions further cause the at least one processor to cause display of at least the portion of the simulation by causing display of a visual comparison of the at least some of the plurality of game presentation objects, the visual comparison indicating an order-of-finish among the at least some of the plurality of game presentation objects.

13. The at least one non-transitory computer-readable storage medium of claim 12, wherein the order-of-finish indicates relative positions of the at least some of the plurality of game presentation objects.

14. The at least one non-transitory computer-readable storage medium of claim 8, wherein the plurality of game presentation objects comprise at least one of a plurality of horses, a plurality of dogs, a plurality of cars, a plurality of watercraft, a plurality of people, a plurality of paths, a plurality of fighters, a plurality of projectiles, or a plurality of ammunition types.

15. A method of electronic gaming implemented by at least one processor in communication with at least one memory, the method comprising:

receiving a selection of a selected game presentation object from a plurality of game presentation objects, wherein the plurality of game presentation objects are associated with a plurality of bingo cards, and wherein the selected game presentation object is associated with a bingo card of the plurality of bingo cards;

determining results for an electronic game based at least in part upon an evaluation of a ball call and at least two bingo cards of the plurality of the plurality of bingo cards, wherein the at least two bingo cards include the bingo card and a second bingo card associated with an unselected game presentation object of the plurality of game presentation objects;

determining results for at least two of the plurality of game presentation objects in a simulation based at least in part upon a ranking of outputs associated with the evaluation of the ball call and the at least two bingo cards, wherein the at least two of the plurality of game presentation objects are associated with the at least two bingo cards, and wherein the results in the simulation for a respective game presentation object of the at least two of the plurality of game presentation objects are provided based upon the ranking; and causing display of the results for the electronic game and at least a portion of the simulation, wherein the portion of the simulation includes display of the the selected game presentation object and the unselected game presentation object based upon the ranking.

16. The method of claim 15, further comprising receiving at least one message from a server, wherein the at least one message is associated with the results for the electronic game.

17. The method of claim 16, further comprising determining the results for the electronic game based at least in part upon the at least one message.

18. The method of claim 16, wherein the at least one message includes at least one of the bingo card or the ball call.

19. The method of claim 15, further comprising causing display of at least the portion of the simulation by causing display of a visual comparison of the at least some of the plurality of game presentation objects, the visual comparison indicating an order-of-finish among the at least some of the plurality of game presentation objects, and wherein the order-of-finish indicates a relative position of the corresponding respective selected game presentation object therein, wherein the order-of-finish indicates relative positions of the at least some of the plurality of game presentation objects.

20. The method of claim 15, wherein the plurality of game presentation objects comprise at least one of a plurality of horses, a plurality of dogs, a plurality of cars, a plurality of watercraft, a plurality of people, a plurality of paths, a plurality of fighters, a plurality of projectiles, or a plurality of ammunition types.

* * * * *